United States Patent [19]
Fink

[11] Patent Number: 6,029,995
[45] Date of Patent: Feb. 29, 2000

[54] VEHICLE OCCUPANT PROTECTION APPARATUS

[75] Inventor: Michael F. Fink, Mesa, Ariz.

[73] Assignee: TRW Vehicle Safety Systems Inc., Lyndhurst, Ohio

[21] Appl. No.: 09/057,814

[22] Filed: Apr. 9, 1998

[51] Int. Cl.[7] .................................................. B60R 21/26
[52] U.S. Cl. ........................... 280/737; 137/68.22; 222/3
[58] Field of Search .................................. 280/737, 741; 102/530, 531; 222/3; 137/68.22, 68.23, 68.13

[56] References Cited

U.S. PATENT DOCUMENTS

| | | |
|---|---|---|
| 3,547,467 | 12/1970 | Pociask . |
| 3,567,245 | 3/1971 | Ekstrom . |
| 3,731,948 | 5/1973 | Risko . |
| 3,743,318 | 7/1973 | Yamaguchi et al. . |
| 3,806,153 | 4/1974 | Johnson . |
| 3,834,729 | 9/1974 | Oka et al. . |
| 4,275,901 | 6/1981 | Okada . |
| 4,289,327 | 9/1981 | Okada . |
| 5,263,740 | 11/1993 | Frey et al. . |
| 5,362,099 | 11/1994 | Fohl . |
| 5,584,505 | 12/1996 | O'Loughlin et al. . |
| 5,642,903 | 7/1997 | Headley . |

*Primary Examiner*—Paul N. Dickson
*Attorney, Agent, or Firm*—Tarolli, Sundheim, Covell, Tummino & Szabo L.L.P.

[57] ABSTRACT

An apparatus (10) includes an inflator structure (12), a rupturable closure member (48), and an initiator assembly (14). The inflator structure (12) defines a chamber (15) storing inflation fluid (16) at an elevated storage pressure. The closure member (48) is fixed and sealed to the inflator structure (12) to block the inflation fluid from flowing outward from the chamber (15), and is subjected to the storage pressure. The initiator assembly (14) includes pyrotechnic material (88) and a support structure (82, 84) which is mounted on the inflator structure. The support structure (82, 84) adjoins the closure member (48) in a load bearing relationship so as to transmit a storage pressure force from the closure member (48) to the inflator structure (12). When the pyrotechnic material (88) is ignited, it produces combustion products that rupture the support structure (82, 84). The closure member (48) has a specified strength which is low enough for the closure member (48) to be ruptured by the storage pressure independently of the combustion products when the support structure (82, 84) has been ruptured by the combustion products.

9 Claims, 4 Drawing Sheets

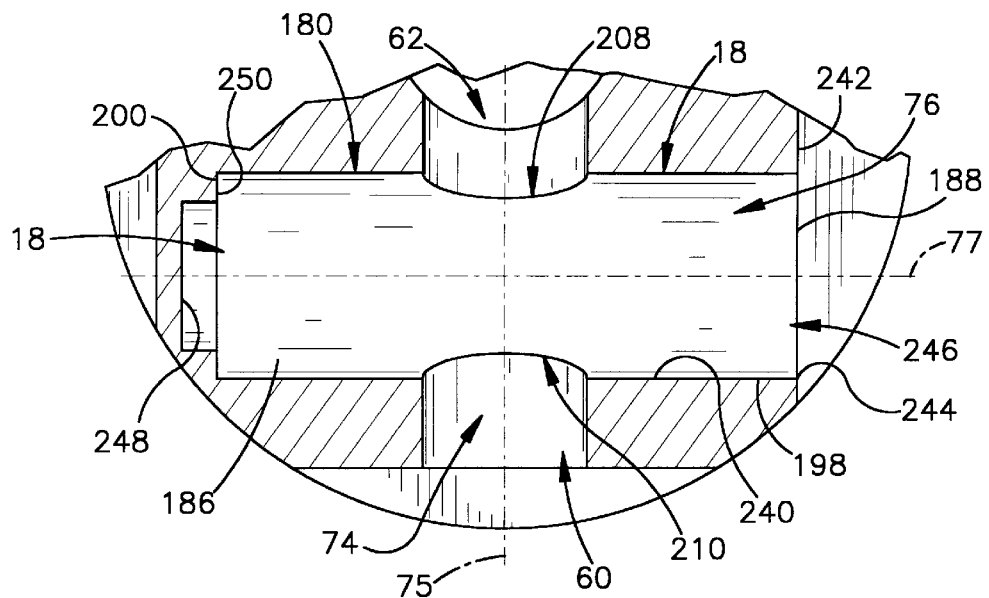
Fig.7
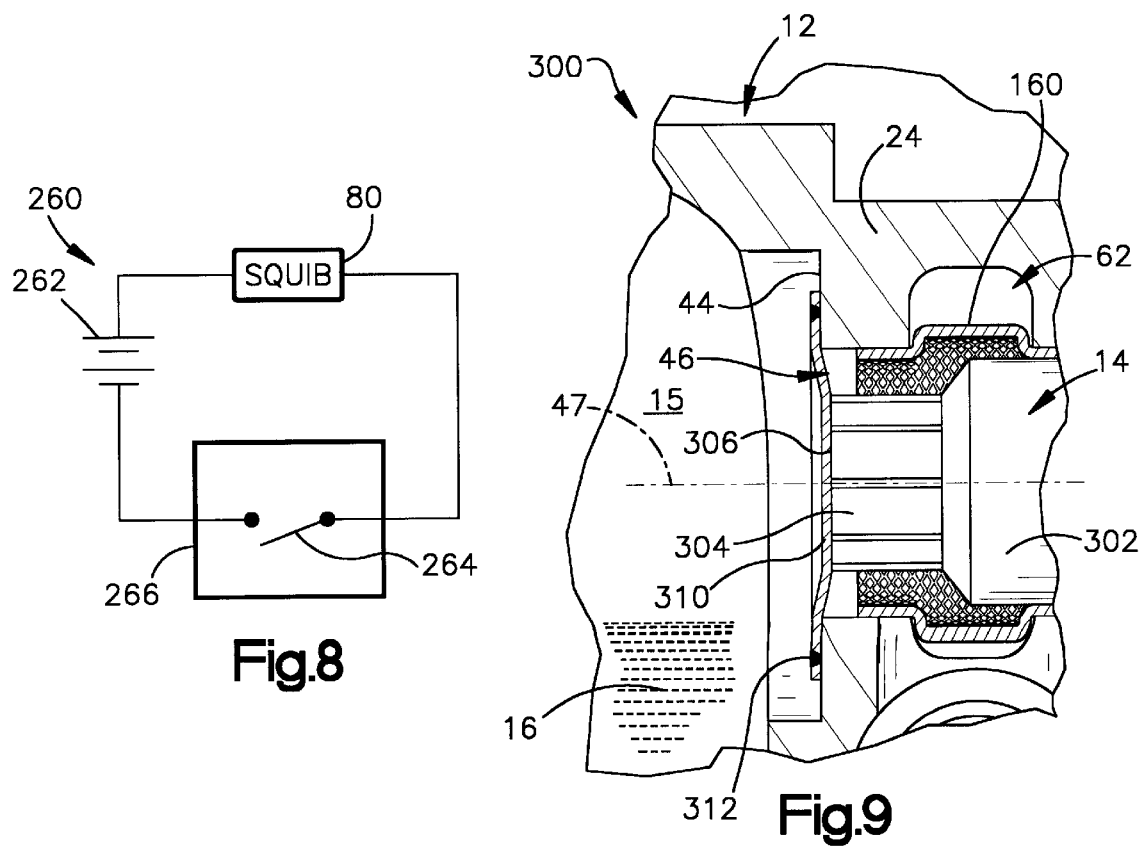
Fig.8
Fig.9

VEHICLE OCCUPANT PROTECTION APPARATUS

FIELD OF THE INVENTION

The present invention relates to an apparatus for inflating an inflatable vehicle occupant protection device to help protect an occupant of a vehicle.

BACKGROUND OF THE INVENTION

An inflatable vehicle occupant protection device, such as an air bag, is inflated upon the occurrence of a vehicle crash. The air bag is part of an apparatus which further includes a crash sensor and an inflator. The crash sensor senses vehicle conditions that indicate the occurrence of a crash. When the crash sensor senses a crash-indicating condition of at least a predetermined threshold level, the inflator is actuated and emits inflation fluid which inflates the air bag into the vehicle occupant compartment. The air bag can then engage a vehicle occupant to help protect the occupant from a forceful impact with parts of the vehicle as a result of the crash.

The inflator includes a container structure defining an inflation fluid pressure chamber with an outlet opening. A rupturable closure disk is fixed and sealed to the container structure to close the outlet opening. The inflator further includes an electrically actuatable initiator which, when actuated, causes the burst disk to rupture so that inflation fluid in the pressure chamber can flow from the inflator to the air bag.

SUMMARY OF THE INVENTION

In accordance with the present invention, an apparatus comprises an inflator structure, a rupturable closure member, and an initiator assembly. The inflator structure defines a chamber storing inflation fluid at an elevated storage pressure. The closure member is fixed and sealed to the inflator structure to block the inflation fluid from flowing outward from the chamber, and is subjected to the storage pressure. The initiator assembly comprises pyrotechnic material and a support structure which is mounted on the inflator structure separately from the closure member.

The support structure adjoins the closure member in a load bearing relationship so as to transmit a storage pressure force from the closure member to the inflator structure. When the pyrotechnic material is ignited, it produces combustion products that rupture the support structure. The closure member has a specified strength which is low enough for the closure member to be ruptured by the storage pressure independently of the combustion products when the support structure has been ruptured by the combustion products.

BRIEF DESCRIPTION OF THE DRAWINGS

The foregoing and other features of the present invention will becomes apparent to one skilled in the art to which the present invention relates upon reading the following description of the invention with reference to the accompanying drawings, wherein:

FIG. 7 is a view similar to FIG. 3 showing parts in a fully assembled relationship; and FIG. 8 is schematic view of an electrical circuit including a part of the apparatus of FIG. 1; and FIG. 9 is a partial side view of an apparatus comprising a second embodiment of the present invention.

DESCRIPTION OF A PREFERRED EMBODIMENT

Figure 1:
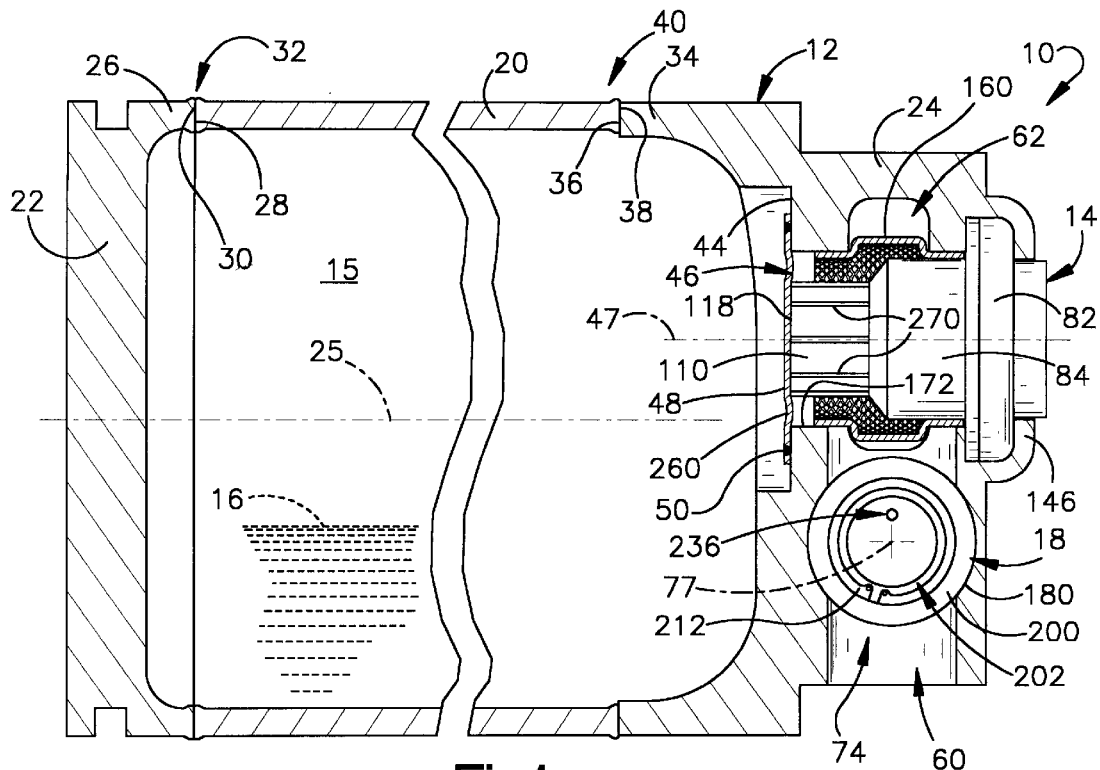
FIG. 1 is a side view, partly in section, of an apparatus comprising a first embodiment of the present invention.

An inflator 10 comprising a first embodiment of the present invention is shown in FIG. 1. The inflator 10 comprises a source of inflation fluid for an inflatable vehicle occupant protection device such as an air bag. The inflator 10 thus includes a container 12 and an initiator assembly 14. The container 12 defines a pressure chamber 15 storing pressurized inflation fluid 16. When the initiator assembly 14 is actuated, it opens the container 12 to initiate an outlet flow of inflation fluid. The inflator 10 further includes a valve assembly 18 which regulates the outlet flow of inflation fluid.

The inflation fluid 16 stored in the chamber 15 preferably consists essentially of helium at a storage pressure within the range of about 4,000 psi to about 7,000 psi. However, the inflation fluid 16 may have any other composition and storage pressure suitable for inflating an air bag or other vehicle occupant protection device.

The container 12 has a tubular body wall 20 and a pair of generally circular opposite end walls 22 and 24, each of which is centered on a longitudinal axis 25. The first end wall 22 has an axially projecting rim portion 26. An annular end surface 28 of the rim portion 26 abuts an annular end surface 30 of the body wall 20. A first friction weld 32 fixes and seals the first end wall 22 and the body wall 20 together at their abutting end surfaces 28 and 30. The second end wall 24 similarly has an axially projecting rim portion 34 with an annular end surface 36 abutting an annular end surface 38 of the body wall 20. A second friction weld 40 fixes and seals the second the end wall 24 and the body wall 20 together at their abutting end surfaces 36 and 38.

The second end wall 24 of the container 12 has an annular inner shoulder surface 44 facing inward of the chamber 15. The inner shoulder surface 44 defines a circular chamber opening 46 which is centered on an axis 47 spaced radially from the central axis 25. A rupturable closure disk 48 extends across the chamber opening 46 to block the inflation fluid 16 from flowing outward. The closure disk 48 overlies the inner shoulder surface 44 around the opening 46, and is fixed and sealed to the end wall 24 by a circumferentially extending weld 50.

In the first embodiment of the present invention, the second end wall 24 of the container 12 defines an inflation fluid exit opening 60, and also defines a fluid flow path 62 extending from the chamber opening 46 to the exit opening 60. The valve assembly 18 is operatively disposed in the flow path 62 near the exit opening 60. The initiator assembly 14 projects into the flow path 62 between the chamber opening 46 and the valve assembly 18.

Figure 2:
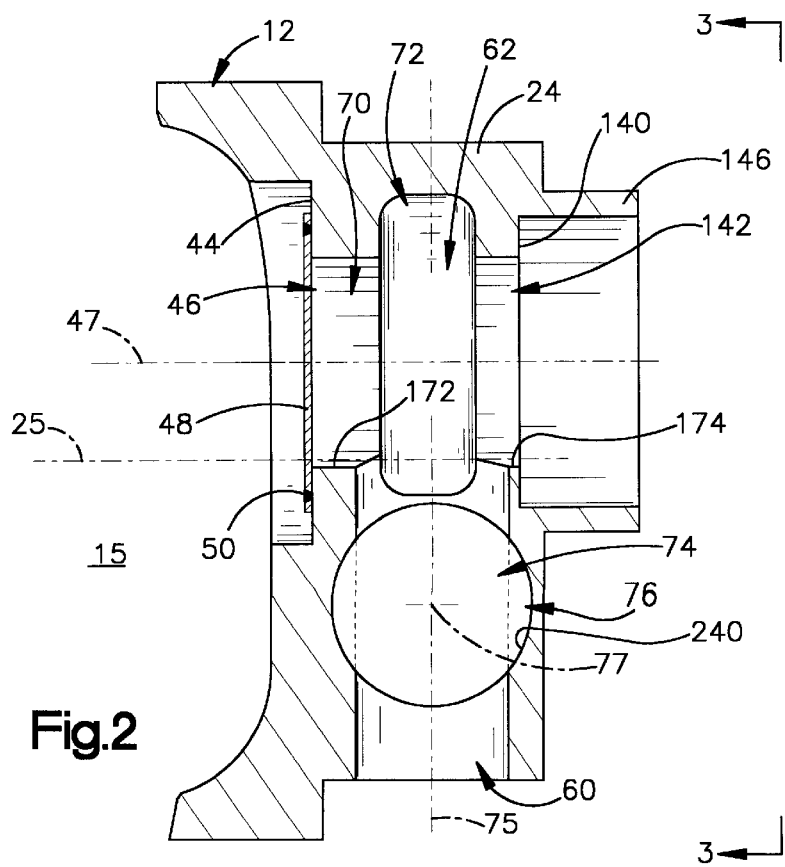
FIG. 2 is an enlarged view showing parts of the apparatus of FIG. 1 in a partially assembled condition.

As shown in greater detail in FIG. 2, the flow path 62 has a plurality of generally distinct portions located between the chamber opening 46 and the exit opening 60. These include a relatively short cylindrical portion 70 extending axially outward from the chamber opening 46. An annular portion 72 of the flow path 62 extends radially and axially outward from the short cylindrical portion 70. A longer cylindrical portion 74 of the flow path 62 extends radially from the annular portion 72 to the exit opening 60, and is centered on an axis 75 perpendicular to the axis 47.

Figure 3:
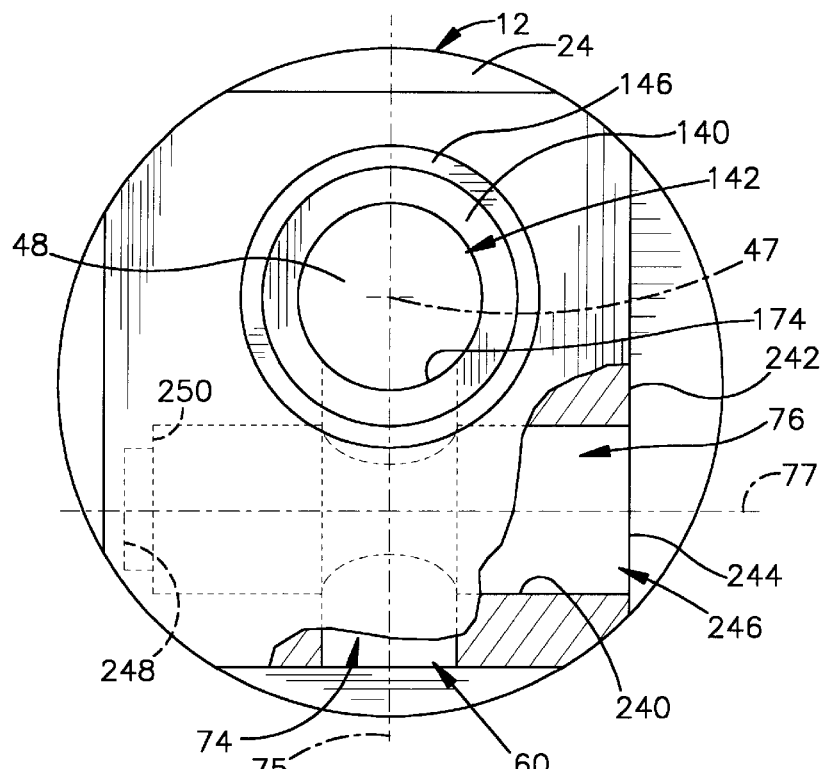
FIG. 3 is a view taken on line 3—3 of FIG. 2.

Also shown in FIG. 2 is a cylindrical valve compartment 76. The valve compartment 76 intersects the radially extending portion 74 of the flow path 62, and is centered on an axis 77 perpendicular to the axis 75. As described more fully below with reference to FIG. 3, the valve compartment 76 is sized to receive the valve assembly 18 (FIG. 1).

Figure 4:
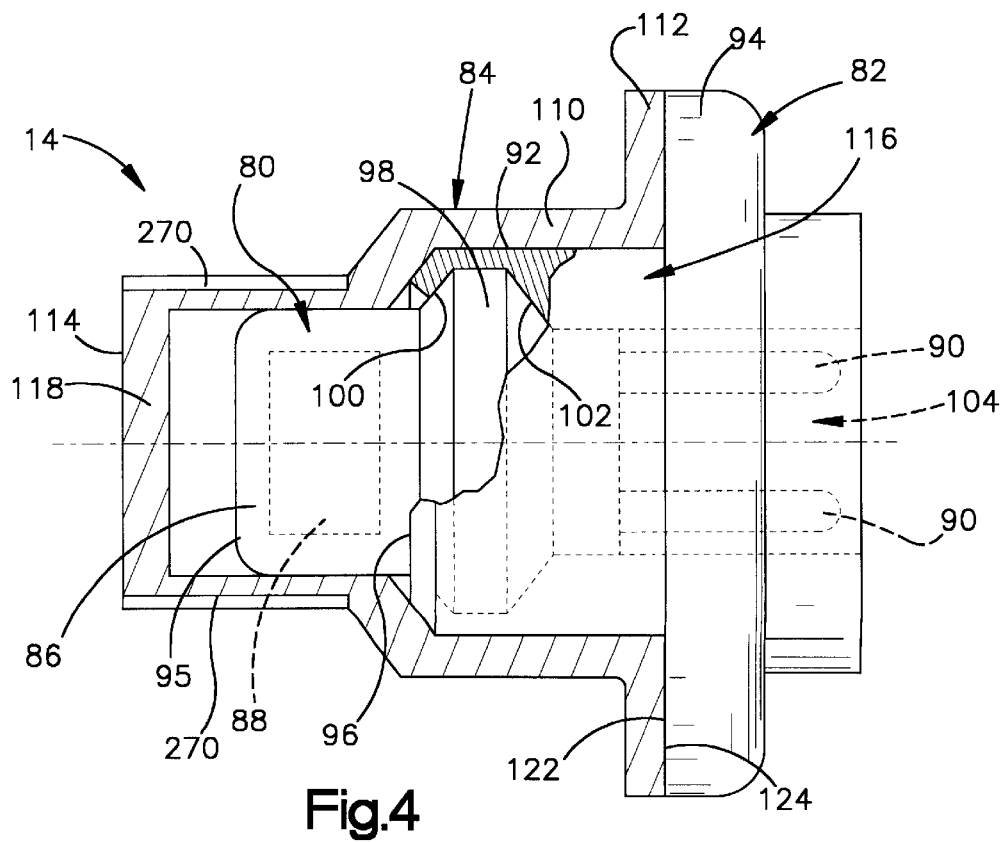
FIG. 4 is an enlarged view, partly in section, of parts of the apparatus of FIG. 1.

The initiator assembly 14 includes an initiator 80 (FIG. 4), a retainer 82, and a support cup 84. The initiator 80 in the preferred embodiment of the present invention is an electrically actuatable device which is known as a squib, and has a generally cylindrical casing 86 containing a small charge of pyrotechnic material 88. The pyrotechnic material 88 is ignited in a known manner upon the passage of electric current through the squib 80 between a pair of electrodes 90 projecting from the casing 86. When the pyrotechnic material 88 is ignited, it rapidly produces combustion products that are spewed outward from the casing 86.

The retainer 82 has a hollow cylindrical body 92 and a ring-shaped peripheral flange 94 that projects radially outward of the body 92. The flange 94 is located at one end of the body 92, and a rim 96 is located at the opposite end of the body 92. The casing 86 is received within the body 92 of the retainer 82, and has an end portion 95 projecting outward from the body 92. The rim 96 on the body 92 of the retainer 82 is crimped against the casing 86. The rim 96 clamps a radially enlarged, tapered portion 98 of the casing 86 firmly between a pair of opposed tapered inner surfaces 100 and 102 of the body 92. The electrodes 90 are accessible in a socket 104 which is open at the opposite end of the body 92.

The support cup 84 also has a hollow cylindrical body 110 and a ring-shaped peripheral flange 112. The body 110 of the support cup 84 has a closed end 114 and an open end 116. A circular end wall 118 of the support cup 84 defines the closed end 114 of the body 110. The flange 112 projects radially outward from the open end 116 of the body 110.

The cylindrical body 92 of the retainer 82 and the projecting portion 95 of the casing 86 are received within the support cup 84. The body 110 of the support cup 84 has a radially stepped configuration so as to mate with the body 92 of the retainer 82, the crimped rim 94 of the retainer 82, and the projecting portion 95 of the casing 86. An inner side surface 122 of the retainer flange 94 abuts an outer side surface 124 of the cup flange 112.

As further shown in FIG. 2, the second end wall 24 of the container 12 has an annular outer shoulder surface 140 facing oppositely away from the annular inner shoulder surface 44. The outer shoulder surface 140 defines a circular opening 142 which is centered on the axis 47. As shown in FIG. 1, the initiator assembly 14 is received through the opening 142, with the flange 112 on the support cup 82 abutting the end wall 24 at the outer shoulder surface 140. The initiator assembly 14 thus projects into the fluid flow path 62 defined by the end wall 24, as noted above. An annular rim-portion 146 of the end wall 24 initially projects axially away from the outer shoulder surface 140 and is subsequently crimped around the retainer flange 94 to hold the initiator assembly 14 securely in place on the end wall 24.

The support cup 84 of the initiator assembly 14 projects inward along the axis 47 into abutment with the closure disk 48 at the chamber opening 46. The initiator assembly 14 is thus mounted on the end wall 24 in a load-bearing relationship with the closure disk 48. More specifically, the closure disk 48 is subjected to the storage pressure of the inflation fluid 16 in the chamber 15. In accordance with the present invention, the closure disk 48 has a specified strength that is not great enough for the closure disk 48 to withstand the stress induced by the storage pressure without support from the initiator assembly 14. Therefore, the closure disk 48 transmits a fluid storage pressure force axially outward against the initiator assembly 14 at the abutting end wall 118 of the support cup 84. The initiator assembly 14, in turn, transmits the storage pressure force to the end wall 24 of the container 12 where the retainer flange 94 adjoins the crimped rim 146 of the end wall 24.

Figure 5:
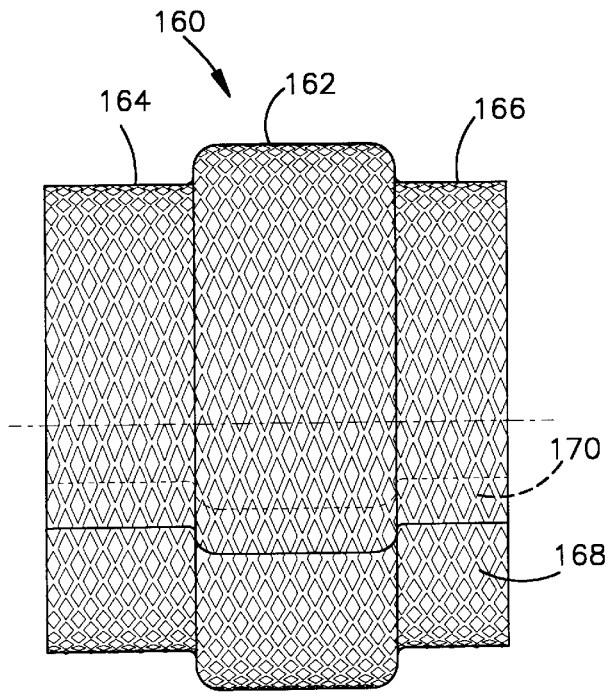
FIG. 5 is an enlarged view of another part of the apparatus of FIG. 1.

A generally cylindrical filter 160 extends circumferentially around the initiator assembly 14 within the fluid flow path 62, as shown in FIG. 1. As shown separately in FIG. 5, the filter 160 has a central section 162 and a pair of opposite end sections 164 and 166. The end sections 164 and 166 of the filter 160 fit closely against a corresponding pair of annular inner surfaces 172 and 174 (FIG. 2) of the end wall 24. The surface 172 extends axially from the chamber opening 46, and defines the short cylindrical portion 70 of the flow path 62. The surface 174 is separated from the surface 172 by the annular portion 72 of the flow path 62. The central section 162 of the filter 160 is radially enlarged so as to project radially into the annular portion 72 of the flow path 62. In the first embodiment of the present invention, the filter 160 is a one-piece structure formed of flattened, expanded metal, and is configured as a rolled strip with overlapping opposite end portions 168 and 170.

The valve assembly 18 is a modular assembly of parts that are interconnected separately from the container 12 and the initiator assembly 14. As shown separately in FIG. 6, the interconnected parts of the valve assembly 18 include a tubular valve housing 180, a metering member 182, and a spring 184 (shown schematically).

The valve housing 180 has a cylindrical side wall 186 and a circular end wall 188, each of which is centered on a longitudinal axis 189. A cylindrical inner surface 192 of the end wall 188 defines a vent 194 extending axially through the center of the end wall 188. The side wall 186 has cylindrical inner and outer surfaces 196 and 198. The cylindrical inner surface 196 defines a longitudinally extending bore 199. An annular end surface 200 of the side wall 186 defines an open end 202 of the housing 180 opposite the end wall 188.

The side wall 186 of the valve housing 180 further has a pair of annular inner edge surfaces 204 and 206. The first inner edge surface 204 defines a circular inlet port 208 extending through the side wall 186. The second inner edge surface 206 defines a circular outlet port 210 extending through the side wall 186 at a location diametrically opposite the inlet port 208.

Figure 6:
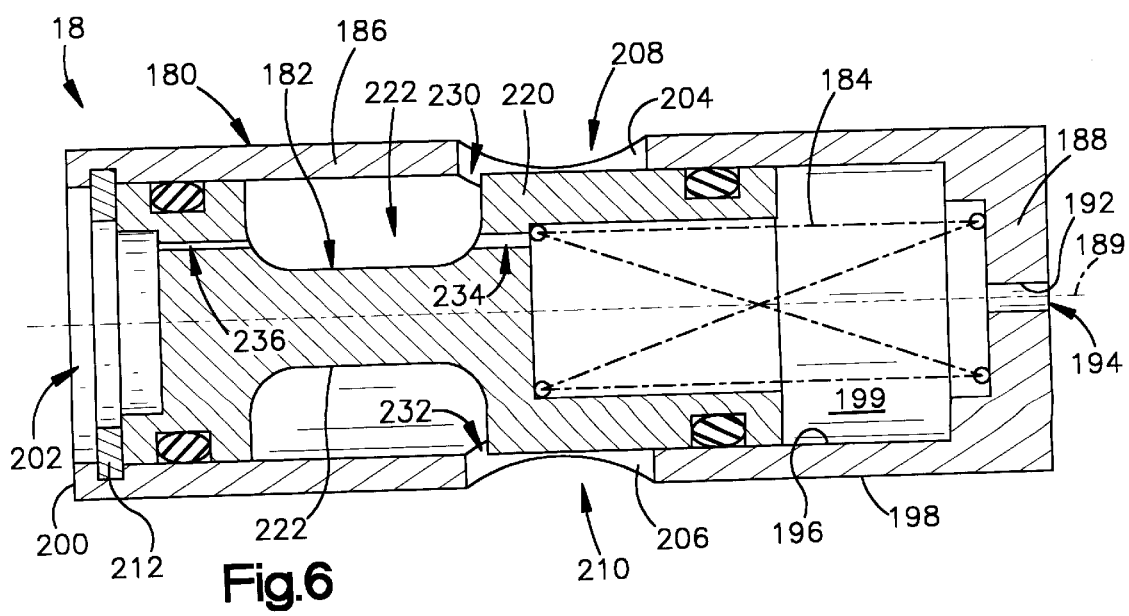
FIG. 6 is an enlarged sectional view of other parts of the apparatus of FIG. 1.

The metering member 182 in the first embodiment of the present invention is a spool which is contained and supported for movement axially within the bore 199. The spool 182 has an initial position in which it abuts a split ring 212 adjacent the open end 202 of the housing 180, as shown in FIG. 6, and is movable axially toward the end wall 188 against a bias of the spring 184.

A cylindrical land 220 on the spool 182 is located next to a circumferentially extending groove 222 in the spool 182. The spool 182 and the housing 180 together define inlet and outlet orifices 230 and 232 which are disposed between the groove 222 and the ports 208 and 210 and which vary in flow area upon movement of the spool 182 axially within the bore 199. A first pilot orifice 234 in the spool 182 communicates the groove 222 with the vent 194. A second, oppositely extending pilot orifice 236 communicates the groove 222 with the open end 202 of the housing 180.

Referring again to FIG. 2, the valve compartment 76 in the end wall 24 of the container 12 is defined in part by a cylindrical inner surface 240 of the end wall 24. A planar side surface 242 (FIG. 7) of the end wall 24 has an annular edge 244 defining a circular open end 246 of the valve compartment 76. A planar inner surface 248 of the end wall 24 has a circular shape centered on the axis 77, and defines a closed inner end of the valve compartment 76.

When the valve assembly 18 is being installed on the end wall 24, it is received longitudinally through the open end 246 of the valve compartment 76. The valve assembly 18 is then moved inward along the length of the valve compartment 76 until the annular end surface 200 of the housing 180 abuts an opposed annular inner shoulder surface 250 of the end wall 24, shown in FIG. 7. The valve assembly 18 is thus moved longitudinally across the radially extending portion 74 of the flow path 62 to an installed position in which the ports 208 and 210 in the housing 180 are centered on the axis 75. The valve assembly 18 is preferably received entirely within the compartment 76 so that the housing 180 does not project longitudinally outward from the open end 246 of the compartment 76. The valve assembly 18 is retained in its installed position by an interference fit where the cylindrical outer surface 198 of the housing 180 adjoins the cylindrical inner surface 240 of the end wall 24.

As shown schematically in FIG. 8, the squib 80 in the initiator assembly 14 is included in an electrical circuit 260 with a power source 262, which preferably comprises the vehicle battery and/or a capacitor, and a normally open switch 264. The switch 264 is part of a sensor 266 which senses one or more vehicle conditions that indicate the occurrence of a crash. Such a sensor is known in the art.

The sensor 266 may sense a crash-indicating condition that meets or exceeds a predetermined threshold level. This indicates the occurrence of crash having a level of severity which is predetermined to require inflation of the air bag or other vehicle occupant protection device associated with the inflator 10. The switch 264 then closes and electric current is directed through the squib 80 to ignite the pyrotechnic material 88 (FIG. 4) in the casing 86. The ignited pyrotechnic material 88 produces combustion products which rupture and emerge from the casing 86 within the support cup 84. The combustion products further rupture and emerge from the support cup 84 within the flow path 62 (FIG. 1). Preferably, the body 110 of the support cup 84 has a plurality of axially extending score lines 270 which are spaced apart circumferentially about its periphery. Each score line 270 defines a coextensive stress riser which is rupturable under the influence of the combustion products emitted from the squib 80. This facilitates rupturing of the support cup 84 radially outward at the periphery of the cylindrical body 110. The fluid storage pressure acting outward against the end wall 118 of the support cup 84 also facilitates peripheral rupturing of the cylindrical body 110 by blocking movement of the end wall 118 inward of the chamber 15 under the influence of the combustion products in the support cup 84.

When the support cup 84 ruptures in the foregoing manner, it can no longer provide the support that the closure disk 48 needs to withstand the stresses induced by the storage pressure acting outward from the chamber 15. This causes the closure disk 48 to rupture under those stresses, and thereby to release the inflation fluid 16 to flow outward through the chamber opening 46 and further outward along the flow path 62 to the valve assembly 18 and the exit opening 60. The filter 160 blocks the severed pieces of the support cup 84 and the closure disk 48 from being carried outward to the valve assembly 18 or the exit opening 60.

The pressure in the chamber 15 decreases continuously from the storage level to the ambient level as the inflation fluid 16 flows outward. However, the valve assembly 18 regulates the outlet flow of inflation fluid to prevent the flow rate from decreasing in direct proportion to the decreasing pressure in the chamber 15. As the inflation fluid flows through the groove 222 (FIG. 6) between the inlet and outlet orifices 230 and 232, some of the inflation fluid flows through the pilot orifices 234 and 236. The inflation fluid flowing through the first pilot orifice 234 flows further outward through the vent 194. The inflation fluid flowing through the second pilot orifice 236 is not vented, but instead pressurizes the space between the spool 182 and the surface 248 defining the closed end (FIG. 7) of the valve compartment 76. This causes the spool 182 to move to the right, as viewed in FIG. 6, and thereby to enlarge the inlet and outlet orifices 230 and 232. Such enlargement of the inlet and outlet orifices 230 and 232 helps to maintain desired flow rates outward along the flow path 62 as the pressure in the chamber 15 decreases from the storage level toward the ambient level.

The flow rates provided by operation of the valve assembly 18 are predetermined with reference to the volume and storage pressure of the inflation fluid 16 in the chamber 15. The initial and subsequent sizes of the inlet and outlet orifices 230 and 232, as determined by the initial and subsequent positions of the spool 182, are specified accordingly. Since the valve assembly 18 is a modular assembly of parts that are interconnected separately from the other parts of the inflator 10, it can be tested separately from the other parts of the inflator 10 to ensure that it will function as specified when it has been installed in the inflator 10.

Referring again to FIG. 1, a particular feature of the present invention relates to the arrangement of the support cup 84, the closure disk 48, and the end wall 24 of the container 12. Specifically, the support cup 84 adjoins the closure disk 48 at location spaced radially inward from the annular inner surface 172 of end wall 24. The closure disk 48 thus has an annular section 260 spanning the support cup 84 and the end wall 24 of the container 12 radially between end wall 118 of the support cup 84 and the inner shoulder surface 44 on the end wall 24 of the container 12. The inflation fluid storage pressure maintains the closure disk 48 in a prestressed condition in which the annular section 260 of the closure disk 48 is deflected outward of the chamber opening 46, as shown in FIG. 1. Importantly, since the annular section 260 of the closure disk 48 is not supported directly by the support cup 84, it can be ruptured under the influence of an elevated level of inflation fluid pressure that may be attained in the chamber 15 upon the occurrence of a vehicle fire. This feature of the present invention enables venting of the inflation fluid 16 without actuation of the initiator assembly 14.

An inflator 300 comprising a second embodiment of the present invention is shown partially in FIG. 9. The inflator 300 has many parts that are substantially the same as corresponding parts of the inflator 10 described above. This is indicated by the use of the same reference numbers for such corresponding parts in FIGS. 9 and 1. The inflator 300 thus includes a container 12 and an initiator assembly 14.

Like the container 12 in the first embodiment, the container 12 in the second embodiment defines a fluid pressure chamber 15 containing inflation fluid 16 under pressure, and has an end wall 24 with an annular inner shoulder surface 44 defining a chamber opening 46. The initiator assembly 14 in the second embodiment projects into a fluid flow space 62 defined by the end wall 24, but includes an alternative support cup 302 which differs slightly from the support cup 84 described above. Specifically, the support cup 302 has a hollow cylindrical body 304 which is just slightly shorter than the hollow cylindrical body 110 of the support cup 84. The support cup 302 thus has a closed end wall 306 which is spaced a slight distance axially outward from the inner shoulder surface 44 of the end wall 24. An alternative closure disk 310 overlies the inner shoulder surface 44 around the opening 46, and is fixed and sealed to the end wall 24 by a circumferentially extending weld 312.

When the chamber 15 is being filled with the pressurized inflation fluid 16, the closure disk 310 becomes deflected outward of the opening 46 under the influence of the increasing fluid pressure in the chamber 15. The closure disk 310 is thus deflected outward into contact with the end wall 306 of the support cup 302, as shown in FIG. 9. In this arrangement, the closure disk 310 is prestressed by the pressurized inflation fluid 16. This reduces the amount of stress that is applied to the weld 312 by the closure disk 310, and thus helps to ensure that the closure disk 310 will rupture at the opening 46 rather than at the weld 312.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
    an inflator structure defining a chamber storing inflation fluid at an elevated storage pressure;
    a rupturable closure member which is fixed and sealed to said inflator structure to block said fluid from flowing outward from said chamber, said closure member being subjected to said storage pressure; and
    an initiator assembly comprising a support structure mounted on said inflator structure separately from said closure member, said support structure adjoining said closure member in a load-bearing relationship so as to transmit a storage pressure force from said closure member to said inflator structure;
    said initiator assembly further comprising pyrotechnic material which, when ignited, produces combustion products that rupture said support structure;
    said closure member having a specified strength which is low enough for said closure member to be ruptured by said storage pressure independently of said combustion products when said support structure has been ruptured by said combustion products.

2. Apparatus as defined in claim 1 wherein said initiator assembly comprises a squib having a casing containing said pyrotechnic material, said support structure comprising a cup-shaped part having a hollow cylindrical body surrounding said casing and a circular end wall abutting said closure member.

3. Apparatus as defined in claim 2 wherein said hollow cylindrical body of said cup-shaped part has a plurality of circumferentially spaced-apart stress risers which are rupturable under the influence of said combustion products.

4. Apparatus as defined in claim 3 wherein said stress risers are defined by a corresponding plurality of axially extending score lines.

5. Apparatus as defined in claim 1 wherein said inflator structure further defines an inflation fluid exit opening and a fluid flow path extending between said closure member and said exit opening, said apparatus further comprising an annular filter extending circumferentially around said support structure within said flow path.

6. Apparatus as defined in claim 5 wherein said flow path has an annular portion extending circumferentially around said support structure at a location spaced axially from said closure member, said filter having a radially enlarged portion projecting radially into said annular portion of said flow path.

7. Apparatus as defined in claim 1 wherein said inflator structure has an annular surface defining a chamber opening, said support structure having an end wall adjoining said closure member at a location spaced radially inward from said annular surface of said inflator structure, said closure member having an annular section spanning said inflator structure and said support structure radially between said edge surface of said inflator structure and said end wall of said support structure.

8. Apparatus as defined in claim 7 wherein said storage pressure maintains said closure member in a prestressed condition in which said annular section of said closure member is deflected axially outward of said chamber opening radially between said edge surface of said inflator structure and said end wall of said support structure.

9. Apparatus as defined in claim 1 wherein said storage pressure maintains said closure member in a prestressed condition in which said closure member is deflected outwardly of said chamber into contact with said support structure.

* * * * *